Aug. 20, 1963    R. E. MICHEL    3,100,963
CONTROL APPARATUS
Filed Nov. 21, 1961
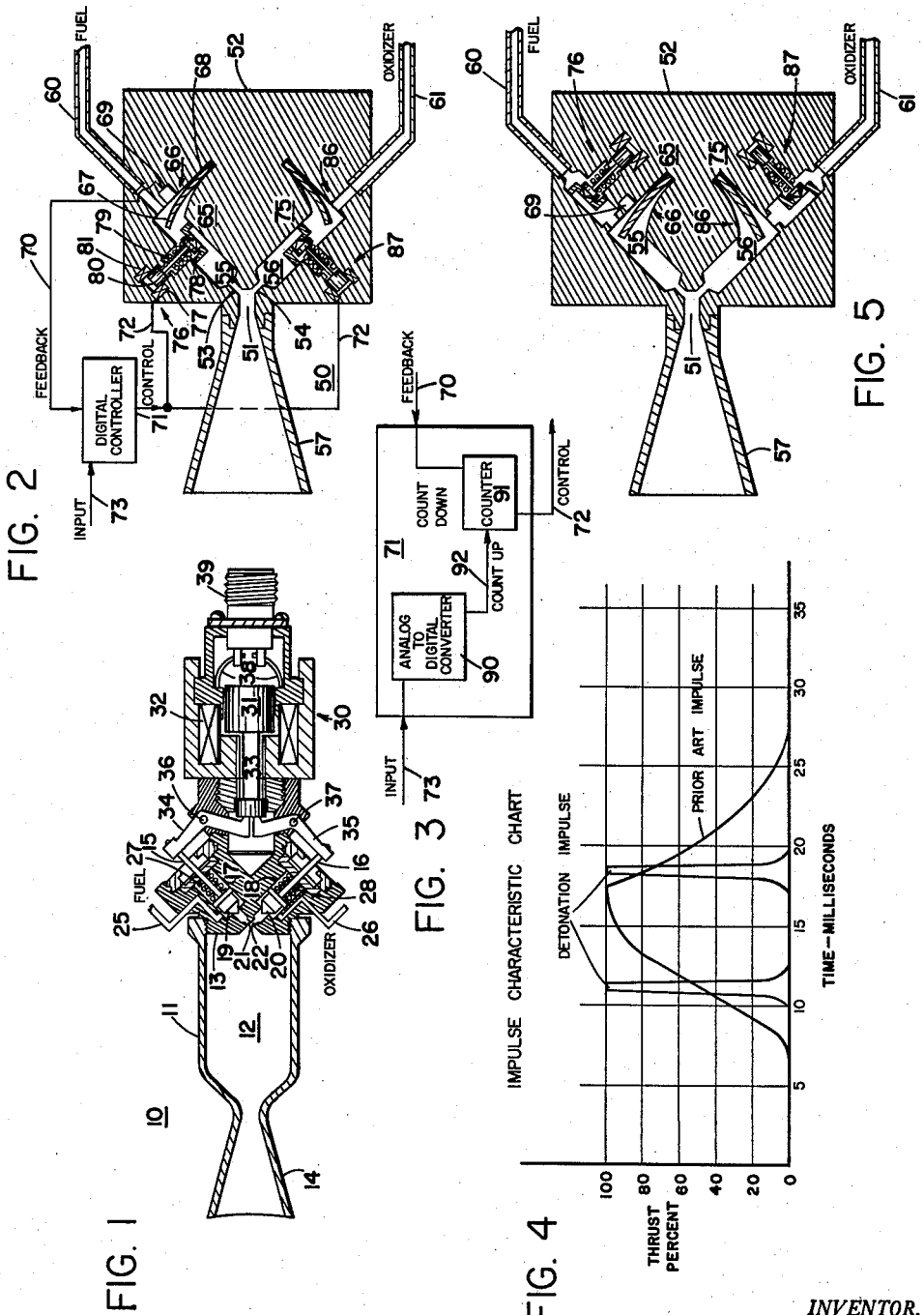
INVENTOR.
RAYMOND E. MICHEL
BY Roger W. Jensen
ATTORNEY.

3,100,963
CONTROL APPARATUS
Raymond E. Michel, Golden Valley, Minn., assignor to Minneapolis-Honeywell Regulator Company, Minneapolis, Minn., a corporation of Delaware
Filed Nov. 21, 1961, Ser. No. 153,866
10 Claims. (Cl. 60—35.6)

This invention relates to reaction control systems and more particularly to digital reaction control systems. A reaction control system is the generic term applied to a control system utilized in various applications including space vehicle stabilization and attitude control in which a force utilized to control the vehicle is a reaction force that follows Newton's Third Law of Motion. The reaction force may be obtained through the utilization of inertia wheels or inertia spheres; acceleration or deceleration of the wheels or spheres results in a reaction force being applied to the vehicle. In addition, it is possible to use hot gas controls or cold gas controls in which a working gas is contained within a chamber within the vehicle. A reaction force is applied to the vehicle in response to the dissipation of the gas from the vehicle; the force is produced by the reaction to the acceleration of a gas of a given mass. It is also possible to use hypergolic controls in which a gas is generated within a chamber within a vehicle through the utilization of hypergolic chemicals. A hypergolic chemical is defined as a chemical which is capable of self-ignition upon contact with another chemical. It should be noted that a hypergolic chemical is not capable of self-ignition upon contact with any other chemical; but rather is capable of self-ignition only upon contact with certain other chemicals. In practice, a plurality of suitable hypergolic chemicals are chosen so that a combustion or detonation occurs and a gas is generated, when the chemicals are brought into contact in a particular manner in a suitable chamber. A reaction force is applied to the vehicle in response to the dissipation of the gas from the vehicle; the force is produced by the reaction of the acceleration of a gas of a given mass.

This invention relates to digital hypergolic reaction control systems which utilize a plurality of hypergolic chemicals, which possess the property of igniting upon contact with one another, to generate a gas which is expelled from the vehicle so as to obtain a reaction force which is utilized to control the vehicle. In the applicant's invention, the gas is alternately generated within and expelled from a suitable chamber which results in a plurality of forces or impulses, equal in magnitude and equally spaced in time, being applied to the vehicle. These pulsating forces or impulses identify the hypergolic reaction control system as a digital control system.

Heretofore, digital hypergolic reaction control systems have not provided the much desired "square wave," short pulse width, output or impulses. The "square wave," short pulse width, impulses have not been obtainable due to the valve actuation lags and ignition lags inherent in the earlier designs. Generally, solenoid controllers are utilized in prior art designs for valve actuation which necessarily limits the valve actuation times to values greater than desirable. In addition, the normal combustion process which occurs in a combustion chamber in a prior art system results in a gradual gas pressure or impulse rise time of a few milliseconds. Further, the combustion chamber required results in a long pressure or impulse decay time of a few milliseconds.

The applicant has eliminated the inherent disadvantages of the prior art digital hypergolic reaction control systems and provides a "square wave," short pulse width, impulse through the utilization of a unique system. The applicant's unique system utilizes a detonation of hypergolic chemicals, rather than normal combustion, to generate the gases. Thus, the rapid generation of the gases by the detonation, which takes place in a few microseconds, eliminates the slow pressure or impulse rise time inherent in a normal combustion process. In addition, the utilization of a detonation allows the elimination of the normal combustion chamber which results in the elimination of the long impulse decay time.

The applicant's unique system also utilizes the pressure developed by the detonation to control the output of the system thereby reducing the value actuation lags and providing a square wave, short pulse width, impulse or output. The output is controlled by controlling the admission of hypergolic chemicals to a detonation chamber. During a detonation, admission of the hypergolic chemicals to the detonation chamber is prevented. Immediately upon completion of the detonation, the pressure is dissipated out to the detonation chamber resulting in an impulse being applied to the vehicle. When the chamber pressure is reduced, additional hypergolic chemicals are permitted to enter the detonation chamber resulting in another detonation. Thus the output of the digital reaction control system is a plurality of "square wave," short pulse width, impulses. The total impulse required to orient the chemical is obtained by producing a sufficient number of impulses.

It is therefore an object of this invention to provide an improved digital hypergolic reaction control system.

This and other objects of the invention will become apparent from a study of the accompanying specification and claims in conjunction with the drawing in which:

FIGURE 1 is a somewhat schematic cross sectional view of a prior art digital hypergolic reaction control jet;

FIGURE 2 is a somewhat schematic cross sectional view of one embodiment of the applicant's invention;

FIGURE 3 is a schematic diagram of a digital controller;

FIGURE 4 is a chart indicating the relative outputs available from a prior art device and from the applicant's invention; and FIGURE 5 is a schematic cross sectional view of the applicant's invention.

Referring now to FIGURE 1 reference numeral 10 generally depicts a digital hypergolic reaction control jet of a conventional or prior art design. It should be understood that the digital hypergolic reaction control jet illustrated in FIGURE 1 is normally utilized in a reaction control system. There may be as many as eight such jets, all identical, controlling the attitude of a space vehicle.

A generally cylindrically shaped combustion chamber housing 11 defines a cylindrically shaped combustion chamber 12. One end of the cylindrical combustion chamber 12 is closed by a valve housing 13 which is securely attached to chamber housing 11. A reaction nozzle 14, generally shaped in the form of a diverging cone, is attached to the other end of the combustion 12 and functions to direct the gases from combustion chamber 12. Two valve elements 15 and 16 are positioned within valve chambers 17 and 18 located within valve housing 13. The valve elements 15 and 16 seat against valve seats 19 and 20 respectively. The valve chambers 16 and 17 communicate with combustion chamber 12 through passages 21 and 22 respectively. A supply line 25 communicates with valve chamber 17 and supplies a suitable hypergolic chemical (such as unsymmetrical dimethyl hydrazine (UDMH) which is normally referred to by those skilled in the art as a fuel). A supply line 26 communicates with valve chamber 18 and supplies a suitable hypergolic chemical (such as nitrogen-tetroxide which is referred to by those skilled in the art as an oxidizer). The valve elements 15 and 16 are biased in the closed position, against valve seats 19 and 20, by valve springs 27 and 28.

A solenoid 30 is provided which is attached to the valve housing 13 by suitable means such as a threaded cylindrical mount. The solenoid 30 comprises a cylindrical armature member 31 and a winding means 32. The armature member 31 has an elongated extension portion 33 which extends along the axis of the armature 31, towards the valve housing 13. Two rocker arms 34 and 35 are positioned between the end of extension portion 33 of armature 31 and the valve elements 15 and 16 respectively. The rocker arms 34 and 35 are pivoted at pivots 36 and 37 so that movement of extension portion 33 of armature 31, to the left, as viewed in FIGURE 1, will withdraw the valve elements 15 and 16 from the valve seats 19 and 20.

In operation, the solenoid windings 32 are energized through leads 38 and connector 39 from a suitable digital controller, (not shown). Each energization of solenoid windings 32 causes armature member 31 and armature extension 33 to be displaced to the left as viewed in FIGURE 1. Displacement of armature 31 and extension portion 33 to the left causes rocker arms 34 and 35 to pivot about pivot points 36 and 37 and withdraw valve elements 15 and 16 from the valve seats 19 and 20. This allows fuel from supply line 25 and oxidizer from supply line 26 to flow through valve chambers 17 and 18 and passages 21 and 22 and enter the combustion chamber 12. Since the fuel and the oxidizer are hypergolic chemicals, they ignite upon contact and normal combustion takes place within combustion chamber 12. Normal combustion is defined as a subsonic combustion. The normal combustion generates gases within combustion chamber 12 and results in a subsonic pressure buildup within the chamber. The pressure is gradually dissipated out of the reaction nozzle 14 which results in an impulse being applied to the device 10 digital toward the right as viewed in FIGURE 1 in accordance with Newton's Third Law of Motion. The impulse generated by the reaction jet 10 is characterized by a relatively long rise time and a relatively long decay time which results in a pulse width of considerable magnitude.

Referring now to FIGURE 2, reference numeral 50 generally depicts one embodiment of the applicant's unique digital hypergolic reaction control system. A small cup-shaped detonation chamber 51 is provided within a control means housing 52. A diverging cone or reaction nozzle 57 is positioned at the open end of combustion chamber 51 and is rigidly attached to the control means housing 52 by suitable means (not shown). It will be noted that the detonation chamber 51 in the embodiment illustrated, is extremely small in size, and is so shaped to bring the propellants together at an interface in chamber 51 to cause a detonation wave combustion. The utilization of a detonation chamber of different shape and size is within the scope of the invention and the applicant does not wish to be limited to the shape and size indicated in the embodiment disclosed. On the closed end of detonation chamber 51 ports 53 and 54 are provided. Port 53 communicates with a valve chamber 55 located within housing 52. Port 54 communicates with a valve chamber 56 located within housing 52. A supply passage 60 is provided which communicates with valve chamber 55. Supply passage 60 supplies, under a pressure of 50 to 150 p.s.i., a suitable hyperical chemical, such as hydrazine which is generally referred to by those skilled in the art as a fuel. A supply passage 61 is provided which communicates with valve chamber 56 and supplies, under a pressure of 50 to 150 p.s.i., a suitable hypergolic chemical such as nitrogentetroxide, generally referred to by those skilled in the art as an oxidizer.

Control means 65 and 75 are positioned with valve chambers 55 and 56 respectively and function to control the supply of hypergolic chemicals to the detonation chamber 51. Control means 65 and control means 75 are identical. Control means 65 comprises two valve means 66 and 76, and control means 75 comprises two valve means 86 and 87. Valve means 66 and 86 are identical and valve means 76 and 87 are identical. Consequently the detailed description of the control means will be limited to the description of control means 65. The detailed description of control means 65 will be limited to the description of valve means 66 and 76.

Valve means 66 comprises a pressure responsive element 67, which may take the form of a reed as illustrated in FIGURE 2. The pressure responsive element 67 is attached to housing 52 as at point 68. The pressure responsive element 67 assumes an open position when valve 76 is in the closed position, as illustrated in FIGURE 2. The pressures on either side of element 67 are substantially equal, however functionally valve 66 may be considered as open. Pressure responsive element 67 will be forced to the closed position when the pressure in valve chamber 55 exceeds the supply pressure in supply pressure 60. Valve means 66 is generally referred to as a flapper valve, check valve, or reed valve by those skilled in the art. It should be noted that valve means 66 may take other structural forms and the applicant does not wish to be limited to the embodiment illustrated in FIGURE 2. For example, this type of valve may be of the rotary type, and controlled electrically or mechanically instead of by pressure. In one embodiment of this type of valve, the valve would be operable in response to a control signal so that it would be closed during the period of increased pressure in chamber 55 and open when valve 76 is open.

A sensing means 69 is provided contiguous valve chamber 55. When the pressure within valve chamber 55 exceeds a critical value sensing means 69 produces a feedback signal indicative thereof. One means of accomplishing this result is illustrated in FIGURE 2 in which sensing means 69 comprises a precision plunger actuated switch or other sensitive means which provides an electrical signal when a pressure is exerted thereon. When pressure responsive element 67 is forced into contact with sensing means 69 upon an increase in pressure in valve chamber 55, a signal is provided indicative thereof.

Valve means 76 comprises a control valve means capable of allowing or preventing flow of a hypergolic chemical therethrough in response to a control signal. A number of various valve configurations will perform this function. One suitable type is the solenoid actuated valve illustrated in FIGURE 2. In FIGURE 2, control valve means 76 comprises valve element 77 which cooperates with valve seat 78 located within valve chamber 55. Valve element 77 is normally biased against valve seat 8 by means of valve spring 9. An armature element 80 is attached to the end of valve element 77 and cooperates with solenoid winding means 81. Energization of solenoid winding means 81 by a control signal results in armature element 80 and valve element 77 being displaced away from valve seat 78 thus opening the valve means 76.

A digital controller 71 is provided to convert an input signal from an attitude sensor to a suitable control signal and to combine the feedback signal with the input signal. The digital controller 1 is connected to sensing means 69 through lead 70 and is connected to winding means 81 of control valve 76 through lead 72. The digital controller receives an input signal through lead 73. FIGURE 3 is a schematic diagram of the digital controller 71. The digital controller 71 comprises an analog to digital converter 90 and a counter means 91. The converter 90 is connected to input lead 73 and is connected to counter 91 through lead 92. Counter 91 is also connected to leads 70 and 72. The operation of the digital controller 71 will be more fully discussed hereinafter.

*Operation*

In operation, the unique hypergolic reaction control system functions as follows: an analog input signal is conducted from a suitable attitude sensing means, such as a gyroscope, through lead 73. This input signal is conducted to analog to digital converter 90 which converts the input signal to a digital signal, that is, a specific number of pulses. The digital signal (pulses) is conducted through lead 92 to counter 91 which counts up the number of pulses. When counter 91 counts the first pulse, a control signal is conducted through lead 72 to winding means 81 of control valve 76. Energization of the solenoid winding 81 causes the valve element 77 to be withdrawn from the valve seat 78 by overcoming the force of the biasing spring 79. Since the valve means 66 is normally open, a hypergolic chemical flows from supply passage 60 through valves 66 and 76, valve chamber 55, and port 53 and enters detonation chamber 51. The control signal in lead 72 also energizes valve means 87 of control means 75 so that a hypergolic chemical is also supplied to the detonation chamber 51 from supply passage 61.

When the hypergolic chemicals come into detonation chamber 51 they are combined so that a detonation is produced and gases are generated therein. This requires that the hypergolic chemicals be parted into the detonation chamber so that an interface is created therebetween. Also, the dimensions of the detonation chamber 51 are critical and must be chosen according to the amount of hypergolic chemicals introduced therein. A detonation is defined as a supersonic combustion. The detonation will take place in approximately 10 to 20 microseconds and therefore, detonation is complete before the gases are dissipated from the detonation chamber 51 through nozzle 57.

Consequently, the pressure within detonation chamber 51 rises to a very high level, in the 15,000 to the 30,000 pound per square inch range. This momentarily raises the pressure within the valve chamber 55 to a value greater than the pressure in supply passage 60 (50–150 p.s.i.). Since valve means 76 is open, this increased pressure causes pressure responsive element 67 to be forced to the closed position thereby preventing the hypergolic chemical in supply passage 60 from being forced upstream beyond pressure responsive element 67. Should the chemical be forced upstream, there would be an undesirable time lag before it would flow back to the chamber. It should be noted that the increase in pressure due to the detonation prevents the hypergolic chemical from entering the chamber. The valve 66 prevents the transmission of the pressure from the chamber 51 to the passage 60. Valve means 86 of control means 75 operates in a similar manner to prevent the hypergolic chemical in supply line 61 from being forced upstream beyond element 86. When valve means 66 is forced to the closed position, sensing means 69 generates a feedback signal (pulse) through lead 70 to the counter 91 of digital controller 71. The feedback pulse counts down on the counter 91.

Immediately after the pressure increase due to the detonation, the pressure in detonation chamber 51 is dissipated through reaction nozzle 57, and results in an impulse being applied to the housing 52 and the space vehicle. As the pressure in detonation chamber 51 is reduced, the pressure in valve chamber 55 is reduced to a value less than the supply pressure and pressure responsive valve 66 is forced open. Again a hypergolic chemical flows from supply passage 60 through valves 66 and 76 and enters detonation chamber 51. A hypergolic chemical also enters detonation chamber 51 from supply passage 61. Again a detonation results, raising the pressure of the detonation chamber 51 and valve chamber 55 and 56 forcing valve means 66 and 86 to the closed position. Another feedback pulse is conducted from the sensing means 69 to counter 91 and another impulse is applied to the space vehicle. If another type of valve is utilized, for example a rotary valve, a control signal will be utilized to operate the rotary valve. The rotary valve may be designed so as to be operable in response to the input signal which controls control valves 76 and 87.

Thus the output of the digital reaction control system is a series of impulses. The number of impulses generated is indicated by the feedback pulse from the sensing means 69 to the digital controller 71. The digital controller 71 compares the feedback signal with the input signal to determine the total number of impulses required to produce the necessary total impulse to reorient the space vehicle in accordance with the input signal.

Taking a specific example, suppose that the analog to digital converter 90 will convert the analog input signal into the correct number of pulses, 10, in this example.

The pulses are conducted from the converter 90 through lead 92 to the counter 91. When the first pulse is received by the counter 91 a control signal is conducted through lead 72 to the control valve means 76. In addition, the counter counts up the 10 pulses conducted from the converter. After the detonation takes place and the pressure responsive valve 66 is forced closed, sensing means 69 generates a feedback pulse through lead 70 to the counter 91. This feedback pulse is counted down on the counter 91. Therefore, nine pulses are now indicated on the counter 91. After nine more detonations and nine more feedback pulses the counter will show zero pulses and the control signal will be terminated. Upon termination of the control signal, control valve means 76 is forced to the closed position by valve spring 77. Control valve means 87 is closed in a similar manner. Therefore, no hypergolic chemical enters detonation chamber 57 and no output is obtained from the system.

The impulse characteristic of the applicant's unique hypergolic reaction control system is illustrated in the Impulse Characteristic Chart in FIGURE 4. The ordinate of the chart is thrust percent and the abcissa is time in milliseconds. The applicant's unique design eliminates the inherent time lags of the prior art digital hypergolic reaction control systems due to the combustion lags, combustion chamber characteristics, and the valve actuation lags. Consequently, the applicant obtains an impulse characterized by a relatively short rise time and a relatively short decay time. Stated otherwise, the applicant obtains a square wave, short pulse width, impulse. The impulse that is obtained by the applicant's unique design is identified in FIGURE 4 by the term "detonation impulse." The impulse that is obtained with the prior art device (such as illustrated in FIGURE 1) is superimposed upon the graph in FIGURE 4 and is identified by the term "prior art impulse." The prior art devices obtain an impulse characterized by a relatively long rise time and a relatively long decay time. This results in a pulse width of considerable magnitude. It should be noted that the pulse width of the detonation impulse is greatly exaggerated in FIGURE 4 for the sake of clarity. Actually the pulse width is only 10–20 microseconds. A comparison of the relative pulse widths illustrates the elimination of the gradual rise time and gradual decay time by the applicant's invention.

The applicant's unique system has the advantage over the prior art devices of retaining a high specific impulse while generating a minimum impulse. Specific impulse is defined as the ratio of the pounds thrust developed per pound of propellant flow. The vast reduction in the length of the detonation chamber as compared to the normal combustion chamber results in a minimum impulse rise time and a minimum impulse decay time and results in a square wave, short pulse width, impulse. In addition, the hypergolic chemical supply operates at a low pressure which results in a low system weight. The applicant's unique system provides a means of generating minimum impulses for obtaining fine attitude control.

FIGURE 5 illustrates an alternate embodiment of the applicant's invention. Like reference numerals refer to like components. The embodiment of FIGURE 5 is similar to the embodiment of FIGURE 2 with the exception that the valves 66 and 86 are positioned intermediate the control valves 76 and 87 and the detonation chamber 51. In all other structural details the embodiment illustrated in FIGURE 5 is identical to the embodiment illustrated in FIGURE 2 and it was not deemed necessary to illustrate all of the components. It will be understood that the embodiment illustrated in FIGURE 5 operates in a manner similar to the embodiment illustrated in FIGURE 2. Consequently, no further discussion is deemed necessary.

The advantages of placing the valves 66 and 86 intermediate the control valves 76 and 87 and detonation chamber is to shield the control valves from the high temperatures and pressures encountered in operation. The disadvantage of positioning the valves as illustrated in FIGURE 5 is that when the control valves are shut off all the hypergolic chemical on the detonation chamber side of the control valve is lost from the system since the pressure responsive valves are normally open.

While I have shown and described specific embodiments of this invention, further modification and improvements will occur to those skilled in the art. I desire it to be understood, therefore, that this invention is not limited to the particular form shown and I intend in the appended claims to cover all modifications which do not depart from the spirit and the scope of this invention.

I claim as my invention:

1. In a digital reaction control system: a housing; a detonation chamber within said housing; a reaction nozzle connected to said chamber; a passage supplying a first hypergolic chemical to said chamber; a passage supplying a second hypergolic chemical to said chamber; mean controlling the supply of said first and said second chemical to said chamber, said means comprising control valve means and pressure responsive valve means positioned within each of said passages, said control valve means normally being closed and said pressure responsive valve means normally being open whereby said first and said second chemical are prevented from entering said chamber, said control valve means being opened in response to a control signal so as to allow said first and said second chemical to enter said chamber thereby producing a detonation which results in an increase in pressure in said chamber, the increase in pressure preventing said first and said second chemicals from entering said chamber, said pressure responsive valve means being closed in response to the pressure increase thereby preventing the pressure increase from being transmitted from said chamber to said passages, the pressure being dissipated through said nozzle resulting in a force being applied to said housing, reduction of said chamber pressure allowing said pressure responsive valve means to open and to allow said first and said second chemicals to enter said chamber thereby producing a second detonation; sensing means for producing a feedback signal indicative of the number of detonations; and means combining an input signal and said feedback signal so as to produce said control signal.

2. In a digital reaction control system: a housing; a detonation chamber within said housing; a reaction nozzle connected to said chamber; a passage supplying hypergolic fuel to said chamber; a passage supplying hypergolic oxidizer to said chamber; means controlling the supply of said fuel and said oxidizer to said chamber, said means comprising control valve means and pressure responsive valve means positioned within each of said passages, said control valve means normally being closed and said pressure responsive valve means normally being open whereby said fuel and said oxidizer are prevented from entering said chamber, said control valve means being opened in response to a control signal so as to allow said fuel and said oxidizer to enter said chamber thereby producing a detonation and increasing the pressure in said chamber, said pressure responsive valve means being closed in response to the increase in pressure thereby preventing the pressure increase from being transmitted to said passages and preventing said fuel and said oxidizer from entering said chamber, the pressure being dissipated from said chamber through said nozzle resulting in a force being applied to said housing, reduction of the pressure allowing said pressure responsive valve means to open and to allow said fuel and said oxidizer to enter said chamber thereby producing a second detonation; sensing means for producing a feedback signal indicative of the number of detonations; and means combining an input signal and said feedback signal so as to produce said control signal.

3. In a digital reaction control system: a housing; a detonation chamber within said housing; a nozzle connected to said chamber; a passage supplying a first hypergolic chemical to said chamber; a passage supplying a second hypergolic chemical to said chamber; means controlling the supply of said first and said second chemical to said chamber, said means comprising first valve means and second valve means positioned within each of said passages, said first valve means normally being closed and said second valve means normally being open, said first valve means being opened in response to a control signal so as to permit said first and said second chemical to enter said chamber thereby producing a detonation and generating gases therein, said second valve means being closed in response to said detonation thereby preventing said first and said second chemical from entering said chamber, said gases being dissipated through said nozzle and resulting in an impulse being applied to said housing, the dissipation of said gases permitting said first valve means to open permitting said first and said second chemical to enter said chamber thereby producing a second detonation; sensing means for producing a feedback signal indicative of the number of detonations; and means combining an input signal and said feedback signal so as to produce said control signal.

4. In a digital control system: a housing; a detonation chamber within said housing; a passage supplying a first chemical to said chamber; a passage supplying a second chemical to said chamber; means controlling the supply of said first and said second chemicals to said chamber, said means comprising first valve means and second valve means positioned within each of said passages, said first valve means normally being closed and said second valve means normally being open, said first valve means being opened in response to a control signal thereupon permitting said first and said second chemical to enter said chamber and detonate producing gases therein, said second valve means being closed in response to the detonation thereby preventing said first and said second chemical from entering said chamber, said gases being dissipated from said chamber resulting in an impulse being applied to said housing, sensing means for producing a feedback signal of the number of detonations; and means combining an input signal and said feedback signal so as to produce said control signal.

5. In a digital control system: a detonation chamber; a passage supplying a first hypergolic chemical to said chamber; a passage supplying a second hypergolic chemical to said chamber; control valve means and pressure responsive valve means positioned within each of said passages, said control valve means normally being closed and said pressure responsive valve means normally being open, said control valve means being opened in response to a control signal so as to permit said first and said second chemical to enter said chamber thereby producing a detonation, said pressure responsive valve means being closed in response to said detonation thereby preventing said first and said second chemicals from entering said chamber, gases produced by said detonation being dissipated from said chamber resulting in an impulse being applied to said chamber, sensing means for producing a feedback signal indicative of the number of detonations; and means combining an input signal and said feedback signal so as to produce said control signal.

6. In a digital control system: a detonation chamber; a passage supplying a first hypergolic chemical to said chamber; a passage supplying a second hypergolic chemical to said chamber; first valve means and second valve means positioned within each of said passages, said first valve means normally being closed and said second valve means normally being open, said first valve means being operable in response to a control signal so as to permit said first and said second chemical to enter said chamber thereby producing a detonation and generating gases therein, said second valve means being closed during said detonation thereby preventing said first and said second chemicals from entering said chamber, said gases being dissipated from said chamber resulting in an impulse being applied to said chamber, sensing means for producing a feedback signal indicative of the number of detonations; and means combining an input signal and said feedback signal so as to produce said control signal.

7. A digital reaction control system comprising: a detonation chamber; a plurality of passages each supplying a hypergolic chemical to said chamber; control means positioned within each of said passages, said control means comprising first valve means operable in response to a control signal to allow the chemicals to enter said chamber, and second valve means operable in response to a pressure produced by a detonation of said chemicals to prevent said chemical from entering said chamber; sensing means producing a feedback signal indicative of the operation of said second valve; and means combining an input signal and said feedback signal so as to produce said control signal.

8. A digital reaction control system comprising: a detonation chamber; a plurality of passages each supplying a hypergolic chemical to said chamber, a detonation occurring upon the mixing of the chemicals within said chamber; control means positioned within each of said passages, said control means comprising a first valve means normally preventing said chemical from entering said chamber, said first valve means being operable in response to a control signal so as to allow said chemical to enter said chamber, and second valve means normally allowing said chemical to enter said chamber, said second valve means being operable in response to a pressure produced by said detonation to prevent the chemicals from entering said chamber; sensing means producing a feedback signal upon the operation of said second valve means; and means combining an input signal and said feedback signal so as to produce said control signal.

9. A digital control system comprising: a detonation chamber; a plurality of passages each supplying a hypergolic chemical to said chamber; control valve means positioned within each of said passages, said control valve means normally preventing said chemical from entering said chamber, said control valve means allowing said chemical to enter said chamber in response to a control signal; check valve means positioned within each of said passages, said check valve means normally permitting said chemical to enter said chamber, said check valve means operable in response to a pressure produced by a detonation of the chemicals so as to prevent said chemical from entering said chamber; sensing means producing a feedback signal upon the detonation of the chemicals; and means combining an input signal and said feedback signal so as to produce said control signal.

10. A digital control system comprising: a detonation chamber; a plurality of passages each supplying a hypergolic chemical to said chamber; first valve means positioned within each of said passages, said first valve means normally being closed, said first valve means being opened in response to a control signal and allowing said chemical to enter said chamber; second valve means positioned within each of said passages, said second valve means normally being open, said second valve means being closed in response to a pressure produced by a detonation of the chemicals thereby preventing the chemicals from entering said chamber; sensing means producing a feedback signal upon the closing of said second valve; and means combining an input signal and said feedback signal so as to produce said control signal.

References Cited in the file of this patent
UNITED STATES PATENTS

| | | |
|---|---|---|
| 2,743,577 | Malick | May 1, 1956 |
| 2,930,526 | Hendrickson | Mar. 29, 1960 |
| 2,995,008 | Fox | Aug. 8, 1961 |